(12) United States Patent
Kruse

(10) Patent No.: US 10,124,284 B2
(45) Date of Patent: Nov. 13, 2018

(54) FILTER SYSTEM AND HOLDER THEREFOR

(71) Applicant: SATA GmbH & Co. KG, Kornwestheim (DE)

(72) Inventor: Albrecht Kruse, Stuttgart (DE)

(73) Assignee: SATA GMBH & CO. KG, Kornwestheim (DE)

( * ) Notice: Subject to any disclaimer, the term of this patent is extended or adjusted under 35 U.S.C. 154(b) by 334 days.

(21) Appl. No.: 14/807,933

(22) Filed: Jul. 24, 2015

(65) Prior Publication Data

US 2016/0023152 A1    Jan. 28, 2016

(30) Foreign Application Priority Data

Jul. 25, 2014   (CN) .................. 2014 2 04172873

(51) Int. Cl.
*B01D 46/00*   (2006.01)

(52) U.S. Cl.
CPC ..... *B01D 46/0086* (2013.01); *B01D 46/0002* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,745,965 A | * | 7/1973 | Ljung | A47L 9/19 116/112 |
| 4,818,385 A | * | 4/1989 | Medley, III | B01D 35/143 210/130 |
| 5,325,707 A | * | 7/1994 | Slater | B01D 46/0086 73/38 |
| 6,224,751 B1 | | 5/2001 | Hofmann et al. | |
| 6,387,156 B1 | * | 5/2002 | Richardson, Jr. | B01D 46/0036 55/323 |
| 6,467,481 B1 | * | 10/2002 | Eswarappa | A62B 7/10 128/205.27 |
| 7,232,253 B2 | | 6/2007 | Isbitsky et al. | |

(Continued)

FOREIGN PATENT DOCUMENTS

| | | |
|---|---|---|
| DE | 19819098 A1 | 11/1999 |
| DE | 10297296 T5 | 9/2004 |

(Continued)

OTHER PUBLICATIONS

German Search Report dated Feb. 22, 2016 for Application No. 20 2015 005 244.4.

*Primary Examiner* — Amber R Orlando
*Assistant Examiner* — Brit E. Anbacht
(74) *Attorney, Agent, or Firm* — Paul D. Bianco; Fleit Gibbons Gutman Bongini & Bianco, PL

(57) ABSTRACT

A holder and a filter system are provided. The holder has: a front wall, a window is formed therein so as to expose the hollow cavity of the holder; a back wall, facing the front wall; a pair of side walls, facing each other and connecting the front wall and the back wall; an opened top portion; and a bottom wall, facing to the top portion and closed so as to define the hollow cavity of the holder. The back wall can be provided with an attachment mechanism. By using the holder and the filter system, an operator may easily determine when to replace the filter cartridge during the operation of the filter system. The holder allows a very good keeping and as well a rapid replacement of the indicator.

23 Claims, 4 Drawing Sheets

(56) References Cited

U.S. PATENT DOCUMENTS

| | | | | |
|---|---|---|---|---|
| 7,563,299 | B2 * | 7/2009 | Baptista da Costa | ................ B01D 46/0024 55/323 |
| 7,896,959 | B1 * | 3/2011 | Schopf, Jr. | ......... B01D 46/0012 210/340 |
| 8,021,618 | B1 * | 9/2011 | Cooper | ............. B01D 46/0086 422/120 |
| 9,314,138 | B2 * | 4/2016 | Conrad | ................... A47L 5/225 |
| D768,812 | S | 10/2016 | Sata | |
| D792,554 | S | 7/2017 | Sata | |
| D793,524 | S | 8/2017 | Sata | |
| D794,752 | S | 8/2017 | Sata | |
| 2002/0029733 | A1 * | 3/2002 | Timmons, Jr. | ...... B01D 46/0086 116/137 R |
| 2002/0174774 | A1 * | 11/2002 | Chen | ......................... A47L 9/14 96/416 |
| 2004/0025880 | A1 * | 2/2004 | Capon | ...................... A62B 9/04 128/206.15 |
| 2004/0201485 | A1 * | 10/2004 | Dermody | .......... B01D 46/0086 340/607 |
| 2004/0240324 | A1 | 12/2004 | Isbitsky et al. | |
| 2005/0035036 | A1 | 2/2005 | Moretto | |
| 2005/0160911 | A1 * | 7/2005 | Friday | ................... A62B 23/02 96/134 |
| 2005/0229561 | A1 * | 10/2005 | Nepsund | ........... B01D 46/0004 55/481 |
| 2006/0144766 | A1 | 7/2006 | Felmeri et al. | |
| 2007/0023333 | A1 * | 2/2007 | Mouhebaty | ............ B01D 35/14 210/91 |
| 2007/0079589 | A1 * | 4/2007 | Ekstrom | ............ B01D 46/0065 55/385.1 |
| 2008/0060975 | A1 * | 3/2008 | Young | ...................... B65D 5/38 206/745 |
| 2010/0294274 | A1 * | 11/2010 | Poirier | ................. A62B 18/088 128/202.22 |
| 2011/0132816 | A1 * | 6/2011 | Vasilescu | ............... B01D 29/21 210/90 |
| 2014/0077949 | A1 * | 3/2014 | Brinkley | ................... F41H 1/02 340/541 |
| 2014/0237763 | A1 * | 8/2014 | Holsten | ..................... A47L 9/20 15/352 |
| 2015/0273381 | A1 * | 10/2015 | Stoner, Jr. | ........... B01D 46/001 96/415 |

FOREIGN PATENT DOCUMENTS

| | | |
|---|---|---|
| EP | 1 405 145 B1 | 4/2004 |
| EP | 1405145 | 4/2004 |
| EP | 2 604 154 A1 | 6/2013 |
| WO | 02/000552 A2 | 1/2002 |
| WO | 03/007088 | 1/2003 |
| WO | 2012/150506 A2 | 11/2012 |

* cited by examiner

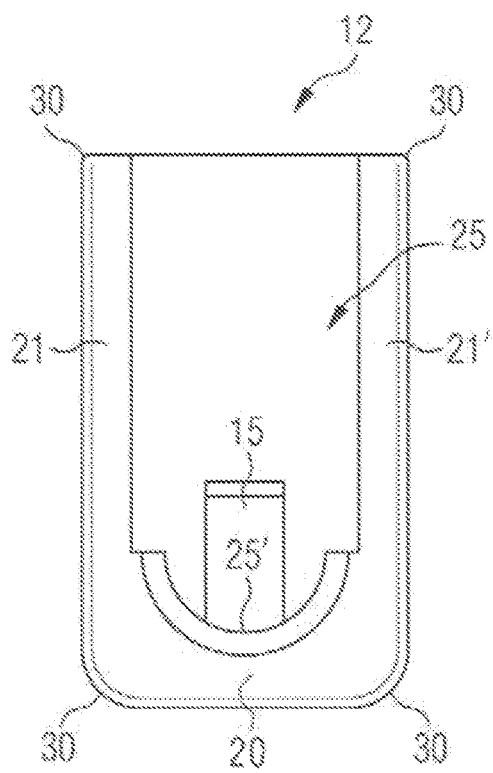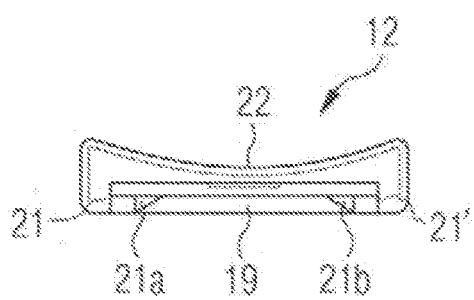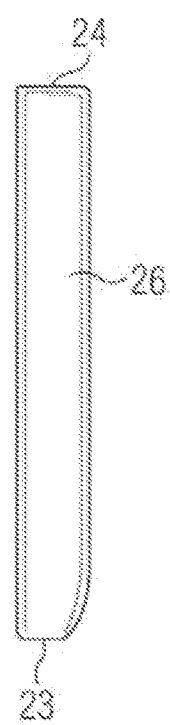
FIG. 4
FIG. 5
FIG. 6

FILTER SYSTEM AND HOLDER THEREFOR

FIELD OF THE DISCLOSURE

The present disclosure relates to a filter system, especially to a filter system used during the painting process and the relative indicator and the holder thereof.

BACKGROUND

Perfect finishes of cars, boats or furniture can only be achieved on an impeccably prepared substrate. Only consistent cleaning of the compressed air in preparation cabins reliably avoids coating flaws causing costly rework and customers' dissatisfaction. For this reason usually a filter system is used to help to create perfect conditions. It is recommended using one or more filtering stage. For example, a first filtering stage with cyclone separator and sintered bronze filter reliably separates oil droplets, condensate and aerosols from the compressed air. By help of a second filtering stage, with a micro fiber fine filter, separates fine particles down to a size of 0.1 micron maybe separated. An automatic condensate outlet of the first filtering stages keeps the service maintenance low and increases the operating safety. Additionally a Pressure regulator valve with pressure gauge for the precise adjustment of outlet pressure may be provided.

Such filter systems are already known from the product portfolio of SATA GmbH & Co.KG available at http://www.sata.com/index.php?id=3196&L=1.

As with all technical products, after a longer period of use the filtering effect of the filter system may get bad. The filter cartridges should be replaced. However, some users do not adhere to the manufacturer specified replacement recommendations without timely reminder, which can lead to undesirably impaired painting quality since the old filter is not timely replaced within its lifetime. In addition, then also the supply of fresh air to the refinisher is no more guaranteed.

SUMMARY OF THE DISCLOSURE

As disclosed herein, the drawbacks of such filter system mentioned above are eliminated so as to ensure the timely replacement of the filter cartridges of the filter devices in the filter system and thus to ensure the effect of the filter system.

The advantages were achieved by equipping the filter system with an indicator (such as a wear-indicator) which reminds the user clearly for filter cartridge replacement; and a holder for such indicator.

An aspect of the disclosure provides a holder, the holder comprises: a front wall, a window is formed therein so as to expose the hollow cavity of the holder; a back wall, facing to the front wall; a pair of side walls, facing to each other and connecting the front wall and the back wall; an opened top portion; and a bottom wall, facing to the top portion and closed so as to define the hollow cavity of the holder, wherein the back wall can be provided with attachment mechanism.

Further, an indicator is insertable into the hollow cavity through the top portion.

Further, the ends of the side walls adjacent to the top portion are formed with inclined cutting portions which are facing to each other.

Further, the surface of the back wall facing to the hollow cavity is formed with a stop means which can stop and hold the indicator.

Further, the attachment mechanism is detachable.

Further, the attachment mechanism is adhesive tape.

Further, the attachment mechanism is made of plastic by injection molding.

Further, the connection parts among the front wall, the back wall, the side walls and the bottom walls are designed with rounded corners.

Further, a portion of the window is shaped so as to be matched with the shape of a control portion of the indicator. Preferably, the portion of the window neighboring to the bottom wall is shaped so as to be matched with the shape of a control portion of the indicator.

Further, the holder is attached to a filter device by the attachment mechanism and the back wall of the holder is shaped so as to be matched with the shape of an attachment portion of the filter device.

Another aspect of the disclosure provides a filter system, the filter system comprises at least one filter device and a holder defined on the above.

Further, an indicator which displays the information associated with the filter device is inserted into the hollow cavity through the top portion of the holder and the holder is attached to an attachment portion of the filter device.

Further, the indicator comprises a time indicator indicating the using time of at least one component of the filter system.

Further, the time indicator is arranged on a first leaf-shaped element.

Further, the indicator further comprises an alarm device notifying the replacement of the at least one component of the filter device.

Further, the time indicator and the alarm device are inserted into the hollow cavity.

Further, the back wall of the holder is shaped so as to be matched with the shape of the attachment portion of the filter device.

Further, the filter device comprises three-stage filter devices, and each filter device is attached with a respective holder, each holder is inserted with a respective indicator which displays the information associated with the filter device attached.

Further, the filter system comprises a warning notice for a missed holder.

Further, the filter system comprises a warning notice for a missed indicator.

Further, the warning notice for a missed indicator is arranged on a second leaf-shaped element.

Further, the warning notice for a missed indicator is inserted into the hollow cavity through the top portion of the holder.

Another aspect of the disclosure provides a filter system, the filter system comprises at least one filter device and an indicator which displays the information associated with the filter device.

Further, the filter system comprises a holder as set forth above, and the indicator is inserted into the hollow cavity through the top portion of the holder.

Further, the holder is attached to an attachment portion of the filter device by the attachment mechanism. Further, the indicator may have any the features mentioned above.

The disclosed filter system is provided with a holder for holding an indicator such as a wear indicator. An operator may easily determine when to replace the filter cartridge during the operation of the filter system. The holder according to disclosure allows a very good keeping and as well a rapid replacement of the indicator.

BRIEF DESCRIPTION OF THE DRAWINGS

The disclosure will be explained in more detail with reference to drawings, in which:

FIG. 4 shows a front view of a holder for holding the wear indicator according to the disclosure;

FIG. 5 shows a top view of the holder shown in FIG. 4; and

FIG. 6 shows a side view of the holder shown in FIG. 4.

DETAILED DESCRIPTION OF THE DISCLOSURE

The disclosure will be illustrated more comprehensively in reference to the figures of the exemplary embodiments of the disclosure. However, the disclosure may be implemented in multiple varied forms and should not be limited to constructions according to the exemplary embodiments illustrated herein. Of course, these exemplary embodiments are provided for making the present disclosure more comprehensive and complete, and can sufficiently convey the scope of the disclosure to the person skilled in the art.

Figure 1:
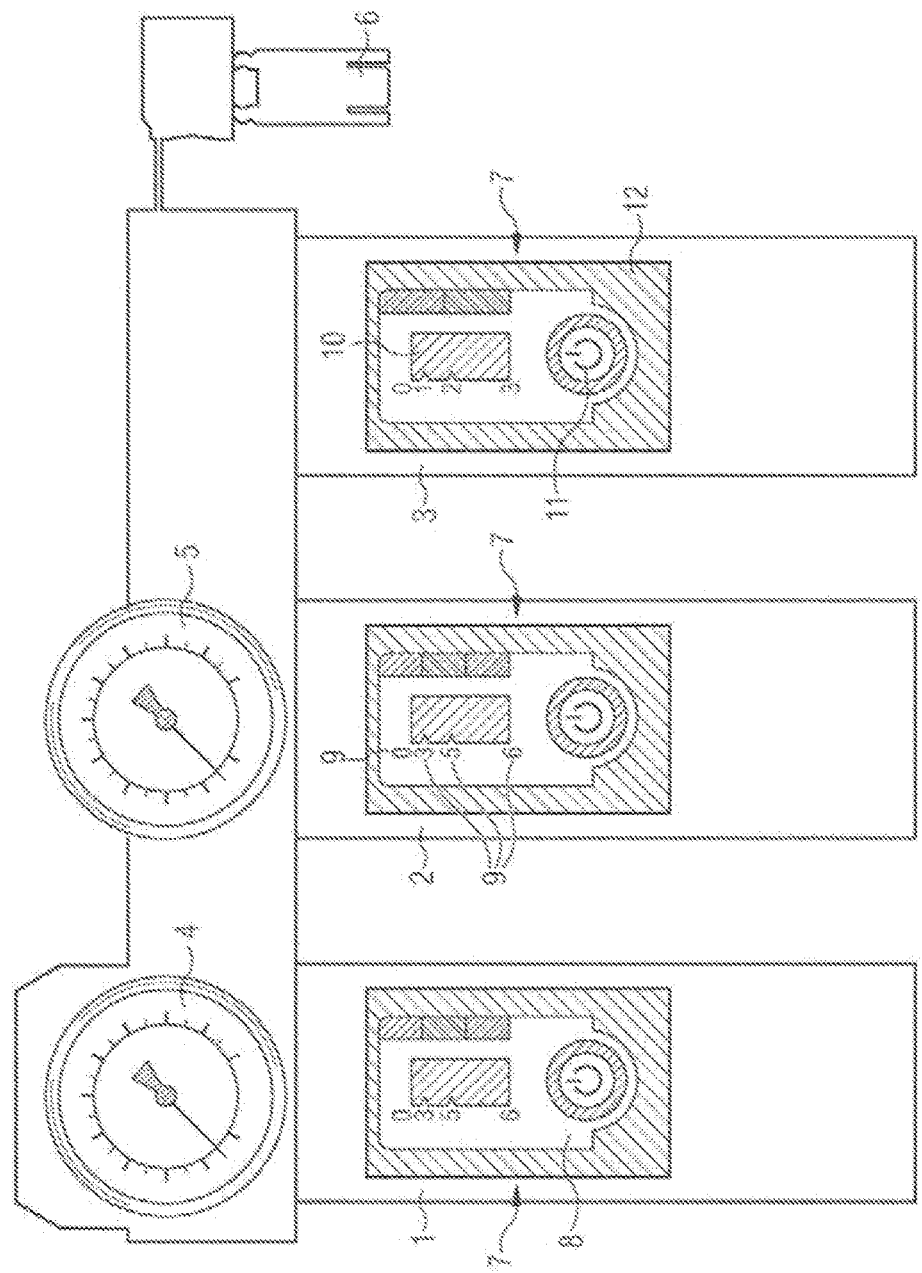
FIG. 1 shows a front view of a filter system with a wear indicator according to the disclosure.

FIG. 1 shows a front view of a filter system with a wear indicator according to the disclosure. The filter system shown in FIG. 1 is used for preparation of compressed air and non-toxic, non-combustible gases. It separates the solid, liquid and partially gaseous components from flowing through the filter medium. These components would otherwise adversely affect the downstream device or the working results and/or respirators.

As shown in FIG. 1, the filter system according to an embodiment of the disclosure may comprise three-stage filter devices 1, 2 and 3. As shown, each of the three filter housing tubes of the three-stage filter devices 1, 2 and 3 may has a substantially cylindrical shape. The filter cartridge in the first-stage filter device 1 is able to separate out particles larger than, for example, five microns and condensed out water and oil as well. By means of a first gauge 4 (shown with its display device), the leaving pressure can be finely adjusted to give a constant outlet pressure and thus largely effected without pressure fluctuations. If the condensate in the first-stage filter device 1 filter achieves a certain level, then automatically opens a drain valve, which is disposed at the lower end of the first-stage filter device 1, until the condensate is pushed out to a small residual amount.

A second stage filter device 2 is connected with its filter cartridge to the filter cartridge within the first stage filter device 1. By help of the second stage filter device 2, even smaller particles can be deposited. The second stage filter device 2 may be also provided with a second gauge 5, with a display device, too. And to the filter cartridge of the second stage filter device 2 a further, third stage filter device 3 is connected. The third stage filter device 3 may have an activated charcoal cartridge. The compressed air is introduced into the first stage filter device 1, and discharged from the third stage filter device 3 and into a connecting element 6 for a breathing air hose or the like. With such a three-stage filter system an excellent treatment of the compressed air is ensured, thus for example, an operator in a spray booth can be supplied with fresh breathing air.

As with all technical products, after a period of use the filtering effect of the filter system may decrease. The filter cartridges should be replaced. However, some users do not adhere to the manufacturer specified replacement recommendations without timely reminder, which can lead to undesirably impaired painting quality since the old filter is not timely replaced within its lifetime. In addition, then also the supply of fresh air to the refinisher is no more guaranteed.

In order to overcome the defects in the prior art, the filter system according to an embodiment of the disclosure may for example be provided with a wear indicator 7. More preferably, in the embodiment shown in FIG. 1, each filter device 1, 2 or 3 may be provided with a respective wear indicator 7. And, further, in the shown embodiment the wear-indicator 7 is working as a visual recognizable time-indicator. Such time indicators are known for example from EP 1405145 B1. The time indicator is here a kind of visual display.

Especially, in the embodiment shown, the wear indicator 7 is arranged on a flat, rectangular leaf-shaped element 8 provided with markings 9. The markings 9 define "months until next replacement" for reminder and are provided on the left side of the leaf, for example. In the embodiment shown, there are markings for 0, 3, 5 and 6 months. The leaf-shaped element 8 is further provided with a liquid migration medium 10, which is stored in a small plastic bag or the like (not shown). The bag wears a knob-shaped actuator 11. After manual pressing the actuator 11 by a fingertip this means causes that the migration medium 10 is going along very slowly a vertical line upwards in the bag.

The migration medium 10 is of a different color than the leaf-shaped 8 element is colored. During use the migration medium 10 does not changes its color. But in other embodiment, the migration medium 10 changes its color.

By the combination of the migration medium 10 and the markings 9, the operator may timely recognize when to replacement the filter cartridge of the corresponding filter device.

The disclosure contemplates that any other time indicator may be used, for example with a haptic display and/or an acoustic warning display; eventually even combinations of such displays. And furthermore it is not imperative to be a liquid migration medium. In addition, any suitable indicator may be used for any other component of the filtering device.

In the filter system according to the disclosure, the wear indicator 7 of each of the filter devices 1, 2 and 3 may be attached to the respective housing tube by the corresponding holder 12. FIG. 4 shows a front view of a holder for holding the wear indicator according to the disclosure; FIG. 5 shows a top view of the holder shown in FIG. 4; and FIG. 6 shows a side view of the holder shown in FIG. 4.

Referring to FIGS. 4 to 6, the holder 12 may be designed as a hollow cuboid which is open at the top. The holder 12 may comprises an open top portion 24, a front wall 22, a back wall 22, a pair of side walls 21, 21', and a bottom wall 23, wherein the side walls 21, 21' are facing to each other and connect the front wall 20 and the back wall 22, and the bottom wall 23 is facing to the top portion 24 and closed so as to define the hollow cavity 26 of the holder 12. A window 25 is formed in the front wall 20 so as to expose the hollow cavity 26. The back wall 23 may be provided with an attachment mechanism so as to be attached in position for the operator to recognize. Preferably, as shown in FIG. 1, the holder 12 is attached to the respective housing tubes of the filter devices 1, 2 and 3 of the filter system so as to be easily recognized by the operator. Obviously, the holder 12 may be attached to any other suitable position of the filter system, even to a position out of the filter system, only if the holder 12 may be easily recognized. Moreover, for example, a possible variation in respect of the arrangement of the wear indicator 7 is that the wear indicator 7 is attached on the filter cartridge, if the filter device has no housing tube.

Also as shown in FIGS. 4-6, the ends of the side walls 21, 21' adjacent to the top portion 24 are formed with inclined cutting portions 21a, 21b which are facing to each other. Thereby, the flat, rectangular leaf-shaped element 8 of the wear indicator 7 may easily slide into the holder 12. Furthermore, the surface of the back wall 22) facing to the hollow cavity 26 is formed with a stop means 15 which can stop the flat, rectangular leaf-shaped element 8 of the wear indicator 7 and hold it in position.

Also as shown in FIG. 4, a portion of the window 25, especially the portion 25' of the window 25 neighboring to the bottom wall 23 is shaped so as to be matched with the shape of an actuator 11 of the wear indicator 7 which is used as a control portion. In the embodiment, the actuator 11 is shaped as circular, and thus the portion 25' is shaped as half-circular so that the operator may easily operate the actuator 11.

The holder 12 is provided with markings according to the flat, rectangular leaf-shaped element 8 and as well provided with markings according to the actuator 11. Due to the window 25 on the front wall 20 of the holder 12, the operator may easily recognize the wear indicator 7 and thus determine the using conditions of the filter cartridge of the filter devices.

In order to allow an easy fixing of the holder 12 on the filter devices 1, 2 or 3, the design of the holder 12 is furthermore adapted to the curvature of the filter devices 1, 2 or 3. That is to say, the back wall 22 of the holder 12 is shaped so as to be matched with the shape of an attachment portion of the filter devices 1, 2 or 3. In the shown preferred embodiment, the filter devices 1, 2 and 3 are cylindrical in shape and thus the back wall 22 of the holder 12 is shaped as circular in cross section. Thus the holder 12 can easily be removable attached to the filter devices 1, 2, 3 by means of an attachment mechanism, preferably by means of a double-sided adhesive tape (not shown). The attachment mechanism may be carried out as any other suitable type.

And in order to make a good visual impact and as well to avoid any risk of injury, the connection parts among the front wall 20, the back wall 22, the side walls 21 and 21' and the bottom wall 23 of the holder 12 are designed with rounded corners 30.

The holder 12 of the disclosure may be made of any material, preferable of any plastic. The holder 12 may be manufactured easily, for example by injection molding.

The filter system may further comprises an alarm device notifying the replacement of the at least one component (the filter cartridge in the above embodiment) of the filter device. The time indicator and the alarm device are both inserted into the hollow cavity 26.

Figure 2:
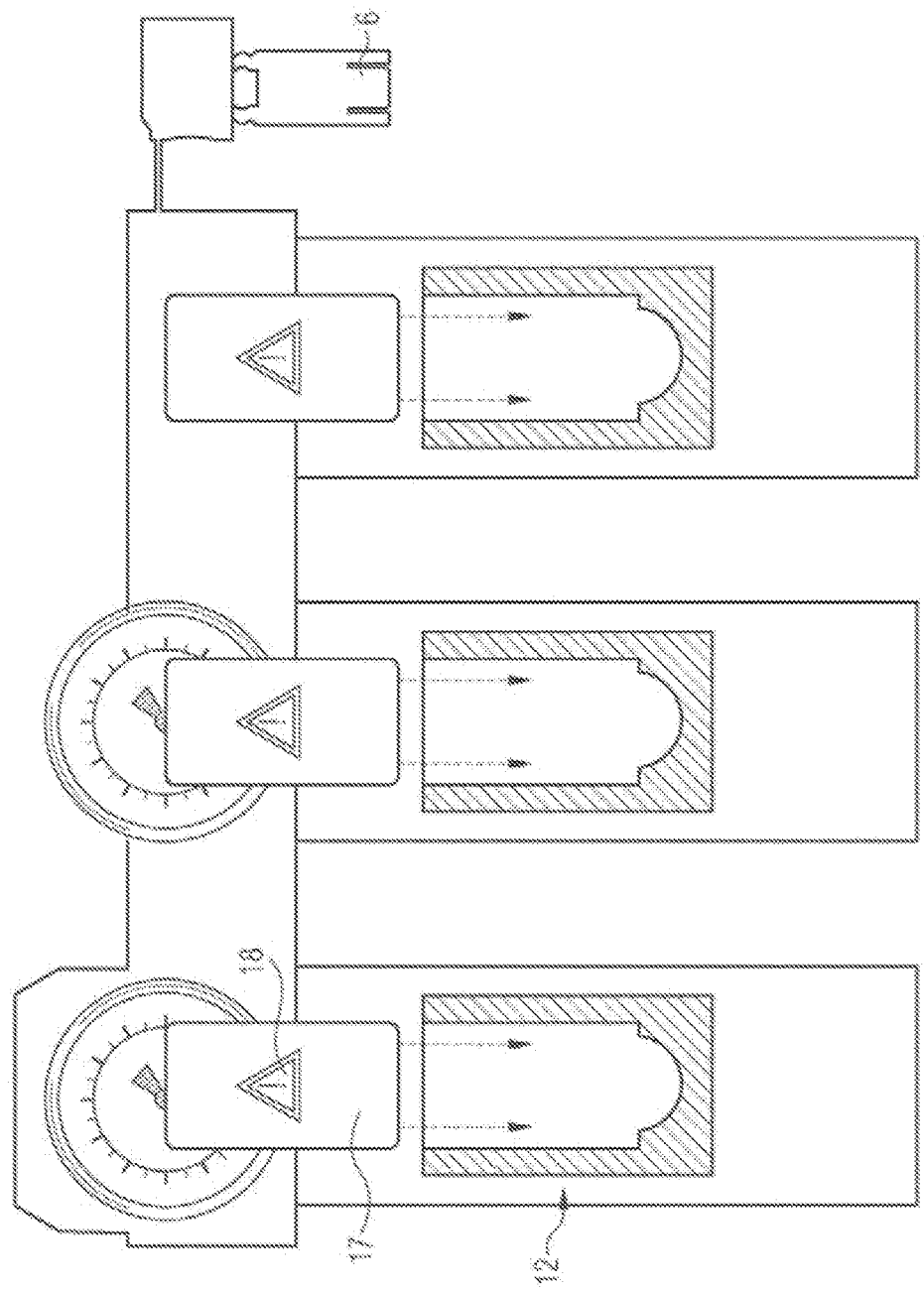
FIG. 2 shows a front view of a filter system with a further warning notice according to the disclosure.

FIG. 2 shows a front view of a filter system with a further warning notice according to the disclosure. In the preferred embodiment of FIG. 2, the filter system is provided with a warning notice 18 for a missed indicator, which is used for reminder the operator to insert an indicator into the cavity when using the filter system. Preferably, the warning notice 18 is arranged on a second leaf-shaped element 17. The two leaf-shaped elements 8, 17 are arranged lying upon each other into the same hollow cavity 26 of the holder 12. Preferably the warning notice 18 is fixed by a removable member in the holder 12. The removable member may preferably be realized by a double-sided adhesive tape (not shown). The leaf-shaped elements 8 and 17 are preferably made of any plastic, too. Preferably, the filter system may comprise at least one warning notice for a missed holder.

Figure 3:
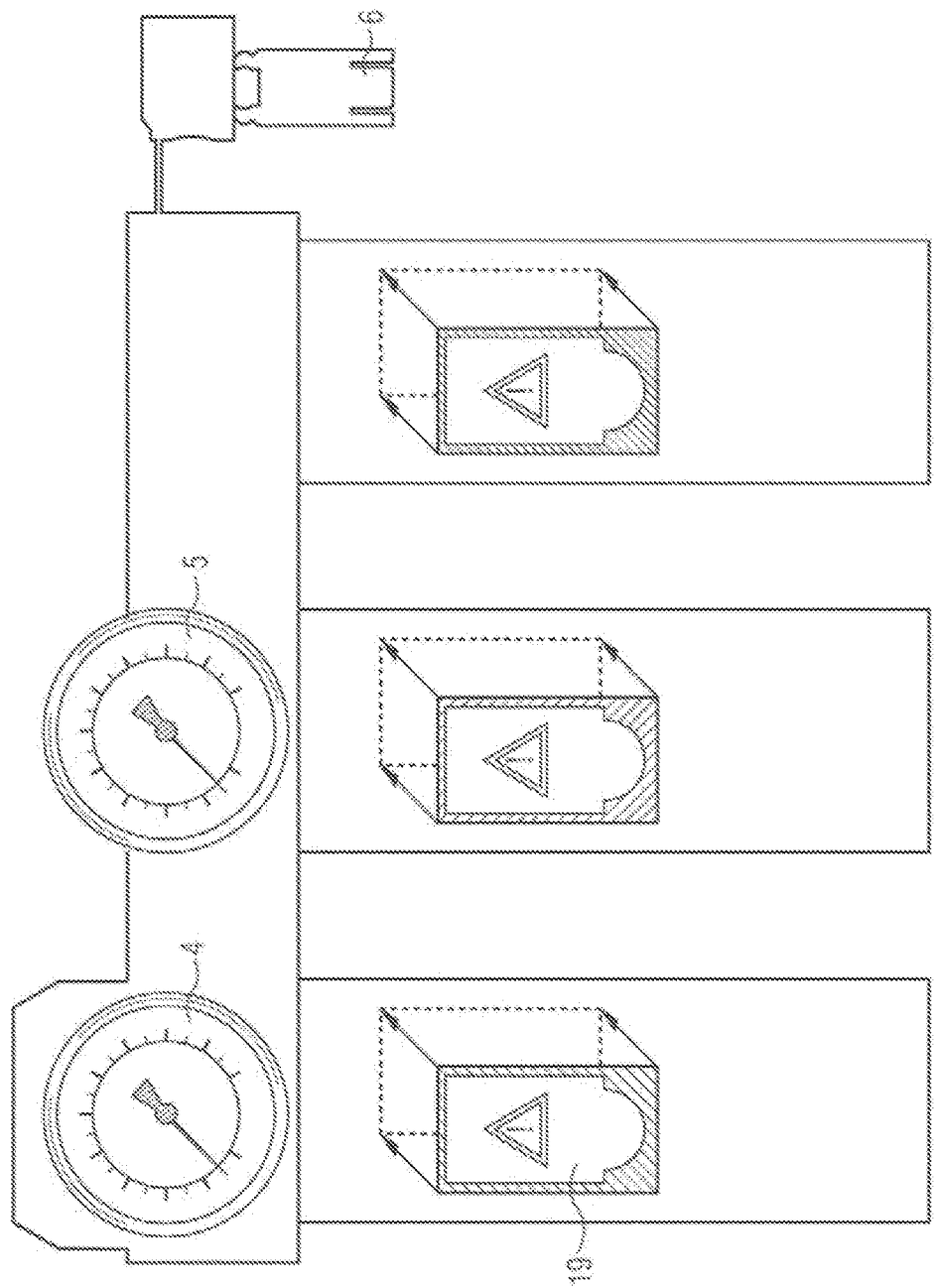
FIG. 3 shows another front view of a filter system with a further warning notice according to the disclosure, in which the warning notice is inserted into the holder of the filter system.

FIG. 3 shows another front view of a filter system with a further warning notice according to the disclosure, in which the warning indicator 19 bearing such warning notice 18 is inserted into the holder 12 of the filter system.

The above is merely preferred embodiments of the disclosure but not to limit the disclosure. For the person skilled in the art, the disclosure may have various alterations and changes. Any alterations, equivalent substitutions, improvements within the spirit and principle of the disclosure should be covered in the protection scope of the disclosure.

What is claimed is:

1. A wear indicator holder for a filter device, the wear indicator holder comprising:
   a flat front wall, a window formed therein so as to expose a hollow cavity of the holder;
   a curved back wall facing the front wall, the back wall contoured to match with a shape of an outer wall of a cylindrical filter device and having an attachment mechanism for attachment to the cylindrical filter device;
   a pair of side walls, facing each other and connecting the front wall and the back wall;
   an opened top portion;
   a bottom wall facing the top portion and closed so as to define the hollow cavity of the holder; and
   a wear indicator inserted into the hollow cavity through the open top portion.

2. The wear indicator holder according to claim 1, wherein the ends of the side walls adjacent to the top portion are formed with inclined cutting portions which are facing each other.

3. The wear indicator holder according to claim 1, wherein the surface of the back wall facing the hollow cavity is formed with a stopper, stopping and holding the wear indicator.

4. The wear indicator holder according to claim 1, wherein the attachment mechanism is detachable.

5. The wear indicator holder according to claim 4, wherein the attachment mechanism is a two-side adhesive tape.

6. The wear indicator holder according to claim 1, wherein the attachment mechanism is made of plastic by injection molding.

7. The wear indicator holder according to claim 1, wherein the connection parts among the front wall, the back wall, the side walls and the bottom walls have rounded corners.

8. The wear indicator holder according to claim 1, wherein a portion of the window is shaped so as to be matched with the shape of a control portion of the indicator.

9. The wear indicator holder according to claim 8, wherein the portion of the window neighboring to the bottom wall is shaped so as to be matched with the shape of a control portion of the wear indicator.

10. The wear indicator holder according to claim 1, wherein the holder is attached to a filter device by the attachment mechanism and the back wall of the holder is further shaped so as to be matched with the shape of an attachment portion of the filter device.

11. A filter system, comprising:
at least one cylindrical filter device; and
a wear indicator holder attached to the cylindrical filter device, the wear indicator holder comprising:
- a flat front wall, a window formed therein so as to expose a hollow cavity of the wear indicator holder;
- a curved back wall facing the front wall, the back wall contoured to match with a shape of an outer wall of the cylindrical filter device and having an attachment mechanism attaching the wear indicator holder to the cylindrical filter device;
- a pair of side walls, facing each other and connecting the front wall and the back wall;
- an opened top portion;
- a bottom wall facing the top portion and closed so as to define the hollow cavity of the holder; and
- a wear indicator inserted into the hollow cavity through the open top portion.

12. The filter system according to claim 11, wherein the wear indicator holder is attached to an attachment portion of the cylindrical filter device by the attachment mechanism.

13. The filter system according to claim 11, wherein the wear indicator comprises a time indicator indicating the using time of at least one component of the filter device.

14. The filter system according to claim 13, wherein the time indicator is arranged on a first leaf-shaped element.

15. The filter system according to claim 13, wherein the filter system further comprises an alarm device notifying replacement of at least one component of the cylindrical filter device.

16. The filter system according to claim 15, wherein the wear indicator and the alarm device are inserted into the hollow cavity.

17. The filter system according to claim 12, wherein the back wall of the wear indicator holder is further shaped so as to be matched with the shape of the attachment portion of the filter device.

18. The filter system according to claim 11, wherein the at least one cylindrical filter device comprises three cylindrical filter devices arranged as a three-stage filter device, and each cylindrical filter device is attached with a respective wear indicator holder, each wear indicator holder includes a respective wear indicator which displays the information associated with the cylindrical filter device attached.

19. The filter system according to claim 11, wherein the filter system further comprises a warning notice for a missed wear indicator holder.

20. The filter system according to claim 11, wherein the filter system comprises a warning notice for a missed wear indicator.

21. The filter system according to claim 20, wherein the warning notice for a missed wear indicator is arranged on a second leaf-shaped element.

22. The filter system according to claim 20, wherein the warning notice for a missed wear indicator is inserted into the hollow cavity through the top portion of the holder.

23. A filter system comprising:
at least one cylindrical filter device;
a wear indicator which displays information associated with the cylindrical filter device; and
a wear indicator holder attached to the filter device, the wear indicator holder comprising:
- a flat front wall with a window formed therein so as to expose a hollow cavity of the holder;
- a curved back wall facing the front wall and contoured to match with a shape of an outer wall of a cylindrical filter device and has an attachment mechanism for attachment to the cylindrical filter device;
- a pair of side walls, facing each other and connecting the front wall and the back wall;
- an opened top portion; and
- a bottom wall facing the top portion and closed so as to define the hollow cavity of the holder, the back wall having an attachment mechanism for attachment of the holder to the at least one cylindrical filter device.

* * * * *